United States Patent
Li et al.

(10) Patent No.: US 7,464,620 B2
(45) Date of Patent: Dec. 16, 2008

(54) ACTUATOR

(75) Inventors: Zhihang Li, Foshan (CN); Saili Li, Guangzhou (CN); Liming Tang, Zhaoqing (CN); Xu Du, Zhaoqing (CN)

(73) Assignee: Schukraoof North America, Lakeshore-Tecumseh, Ontario (CA)

( * ) Notice: Subject to any disclaimer, the term of this patent is extended or adjusted under 35 U.S.C. 154(b) by 792 days.

(21) Appl. No.: 10/997,426

(22) Filed: Nov. 24, 2004

(65) Prior Publication Data

US 2006/0117890 A1   Jun. 8, 2006

Related U.S. Application Data

(60) Provisional application No. 60/627,628, filed on Nov. 11, 2004.

(51) Int. Cl.
*F16H 1/16* (2006.01)

(52) U.S. Cl. .................. 74/425; 74/424.5; 74/424.7

(58) Field of Classification Search .............. 74/425, 74/434, 412 R, 413, 424.5, 424.7, 427; 15/250.3
See application file for complete search history.

(56) References Cited

U.S. PATENT DOCUMENTS

| | | | |
|---|---|---|---|
| 3,675,470 A | 7/1972 | Ohno | |
| 3,972,597 A | 8/1976 | Repay et al. | |
| 4,202,603 A * | 5/1980 | Miyauchi | 359/874 |
| 4,324,454 A * | 4/1982 | Kumai | 359/873 |
| 4,586,393 A | 5/1986 | Mooney et al. | |
| 4,627,300 A | 12/1986 | Stoy | |
| 5,217,278 A | 6/1993 | Harrison et al. | |
| 5,887,353 A | 3/1999 | Beckingham | |
| 5,983,439 A * | 11/1999 | Hojnacki | 15/250.3 |
| 6,050,641 A | 4/2000 | Benson | |
| 6,394,220 B1 | 5/2002 | Kurokawa et al. | |
| 6,761,204 B1 * | 7/2004 | Chou | 160/177 R |
| 6,814,209 B1 | 11/2004 | Acosta | |
| 6,952,976 B2 * | 10/2005 | Roither et al. | 74/425 |
| 7,261,012 B2 * | 8/2007 | Meyer et al. | 74/421 A |

* cited by examiner

*Primary Examiner*—David M Fenstermacher
(74) *Attorney, Agent, or Firm*—Kang Intellectual Property Law, LLC; Grant D. Kang

(57) ABSTRACT

An actuator for an automotive seat that includes two main assemblies: (1) a motor assembly; and (2) a gearbox assembly. The gearbox assembly includes multiple stages of gear reduction and a dividing plate. In some embodiments, the gearbox assembly has a single-lead worm, a worm gear with a right-hand helix tooth direction, and a worm gear with a left-hand helix tooth direction. The worm gears are driven by the single-lead worm. The single-lead worm has two ends, one end has a right-hand tooth helix direction, and the other end has a left hand helix direction.

24 Claims, 8 Drawing Sheets

_US 7,464,620 B2_

ACTUATOR

CROSS-REFERENCE TO RELATED APPLICATIONS

This application claims priority of U.S. Provisional Application No. 60/627,628, filed Nov. 11, 2004.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to actuators and, more particularly, to a transmission improvement for an actuator.

2. Related Art

Many mechanical devices need to be moved to a user selected position and then held there against a force that is biased to return the device to its original position. Such devices are commonly used for ergonomic supports in seating, especially lumbar supports for automobile seats. Lumbar supports exert a comfortable force against the lumbar spine of a seat occupant. This force is applied mechanically through a wide variety of configurations including arching, bending, tightening, extending or otherwise moving a pressure surface. Pressure surfaces are of an equally wide variety including straps, paddles, "baskets," arching surfaces, bowed surfaces and so forth. These devices must allow the user to select a desired position for the pressure surface, and thereafter hold that position after the user has released whatever device and linkage has been used to move the pressure surface to the selected position. The linkages are of a wide variety including rods, levers, springs, cables, and especially coaxial traction cables such as Bowden cables. The linkage, for example a Bowden cable, has a connection to the lumbar support at one end and a connection to an actuator at the other end. The actuator is positioned where the user may operate it, typically at the edge of the seat.

There is a great variety of actuator structures used for these purposes, both mechanical and electrical. They share in common the function of moving the pressure surface to a selected position, and then holding the pressure surface in that position against a force exerted by the seat occupant's weight. That force is biased towards returning the pressure surface to its original position, which is usually flat. The most common linkage, the Bowden cable, has a flexible conduit, also called a "sleeve" or "sheath," through which runs a coaxially sliding wire. Actuators have a seat for the end of the sleeve and seat for the end of the wire. The opposite ends of the wire and sleeve are connected to different portions of the lumbar or other ergonomic support, such that pulling the wire through the sleeve moves the pressure surface to the desired position. Accordingly, the most commonly used actuators are designed to pull a Bowden cable wire through a Bowden cable sleeve. The actuators must exert the force necessary to pull the wire through the sleeve to actuate the lumbar support. They must also hold the wire against the return force of the passenger's weight on the lumbar support pulling the wire back into the sleeve. In addition the actuators must also be able to release the holding force from the wire so that the user may return the ergonomic device to its original position or to another selected position.

Actuators achieve these necessary functions of movement, holding and release through a variety of mechanisms. Electronically powered actuators frequently use gears connected to take up wheels or drums for pulling the Bowden cable wire. Manual actuators may also use gears and take up drums, but more typically include a brake, ratchet or clutch. Brakes, ratchets and clutches are powered by levers or hand wheels turned by the users hand.

Previously, a single worm/worm wheel transmission was used to operate the Bowden cable. This design fails to eliminate axial loads on the actuator motor shaft. Consequently, it causes the shaft to move axially in its housing and hit the end of it repeatedly, producing an undesirable clicking noice. There is a need to control unwanted axial motion of the motor shaft worm assembly. There is a continuing need to control radial and transverse motion of the shaft worm assembly.

The single worm/worm wheel meshing design also has a lower efficiency for power transmission and requires a higher reduction rate if the other conditions are the same. There is a need for greater efficiency.

Typically, the worm and worm wheel module is undersized to save space, and the insufficient mechanical strength of the single worm/worm wheel transmission often results in tooth breakage. The axial motion causes rapid wear of the washer at the end of the shafts. There is a need for greater durability.

There remains a continuing need in the art for reducing the size and the profile of the assembled actuator. There also remains a continuing need in the art for easing and streamlining assembly of the component parts of the actuator. Finally, there is a continuing need to reduce the number, and consequently the expense, of the components to be assembled into actuators.

SUMMARY OF THE INVENTION

It is in view of the above problems that the present invention was developed. The invention is an actuator for an automotive seat. The actuator includes two main assemblies: (1) a motor assembly; and (2) a gearbox assembly.

In a first embodiment, the gearbox assembly has multiple stages of gear reduction. A dividing plate is used to separate the stages of gear reduction. Further, the dividing plate includes a recess that receives a worm. In some embodiments, the dividing plate also includes a protrusion to limit axial movement of the worm.

In a second embodiment, the gearbox assembly has three main components: a single-lead worm, a worm gear with a right-hand helix tooth direction, and a worm gear with a left-hand helix tooth direction. The worm gears are driven by the single-lead worm. The single-lead worm has two ends, one end has a right-hand tooth helix direction, and the other end has a left hand helix direction.

One aspect of the invention reduces the motor axial force of lumbar support actuators and eliminates the click noise phenomena. Another aspect optimizes inside structure of the actuator and increases power transmission efficiency. Another aspect eliminates the breakage of the gear teeth of the actuator. The invention eliminates the shaft force of the motor, optimizes the inner structure of the gear box, increases the transmission efficiency, and reduces the possibility of broken teeth and broken cables Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
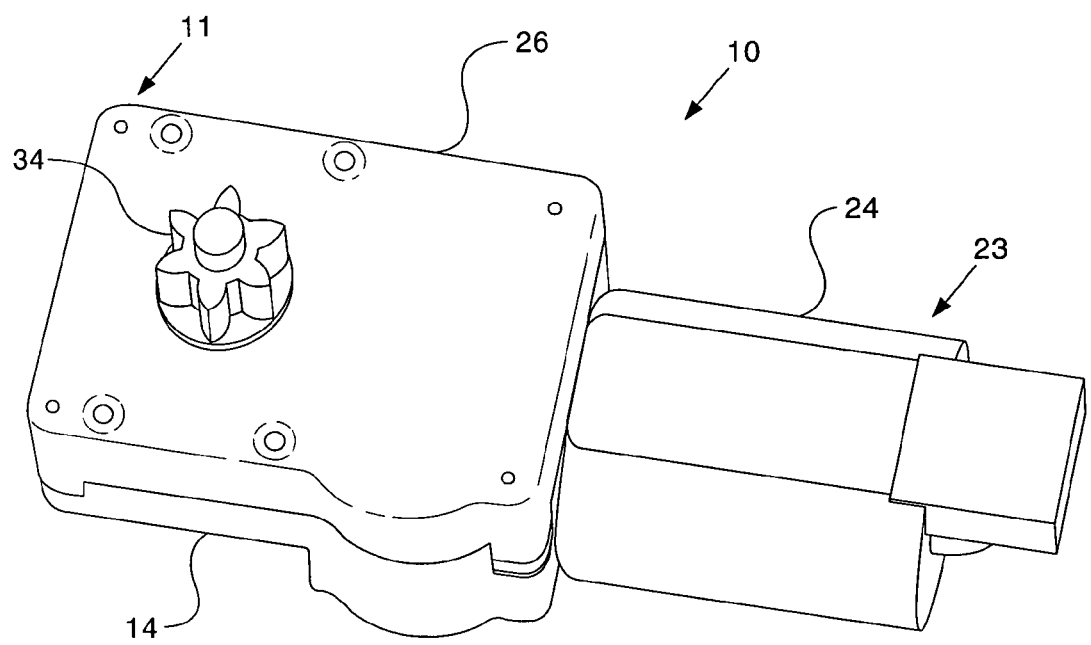
FIG. 1 is a perspective view of the assembled first embodiment including a cover.

Referring to the accompanying drawings in which like reference numbers indicate like elements, FIG. 1 illustrates an actuator in a first embodiment, generally indicated by numeral reference 10. The actuator includes a motor assembly 23 and a gearbox assembly 11. The motor assembly 23 is connected to the gearbox assembly 11 and includes a motor 24. The gearbox assembly 11 includes multiple stages of gear reduction. The gearbox assembly includes a gearbox housing 14 and a gearbox cover 26. The gearbox cover 26 is adapted for mounting on the gearbox housing 14. In the depicted embodiment, an output member 34 protrudes through the gearbox cover 26.

Figure 2:
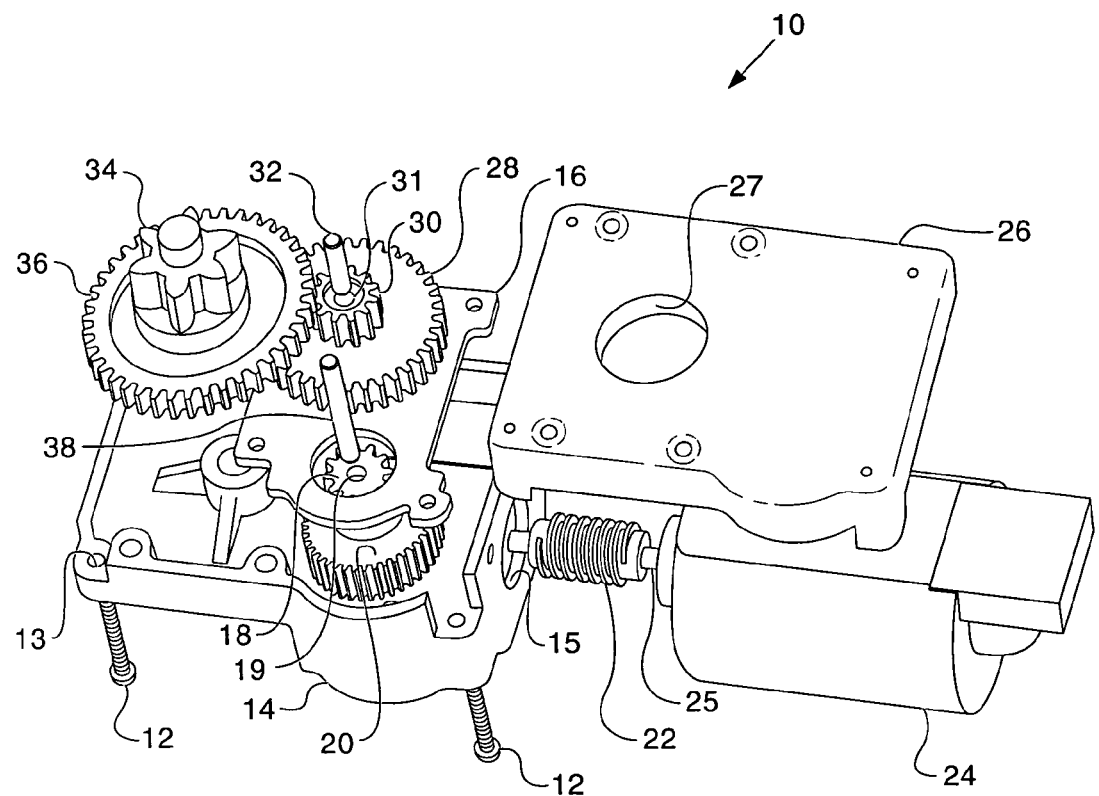
FIG. 2 is an exploded perspective view of an actuator in a first embodiment.
Figure 3:
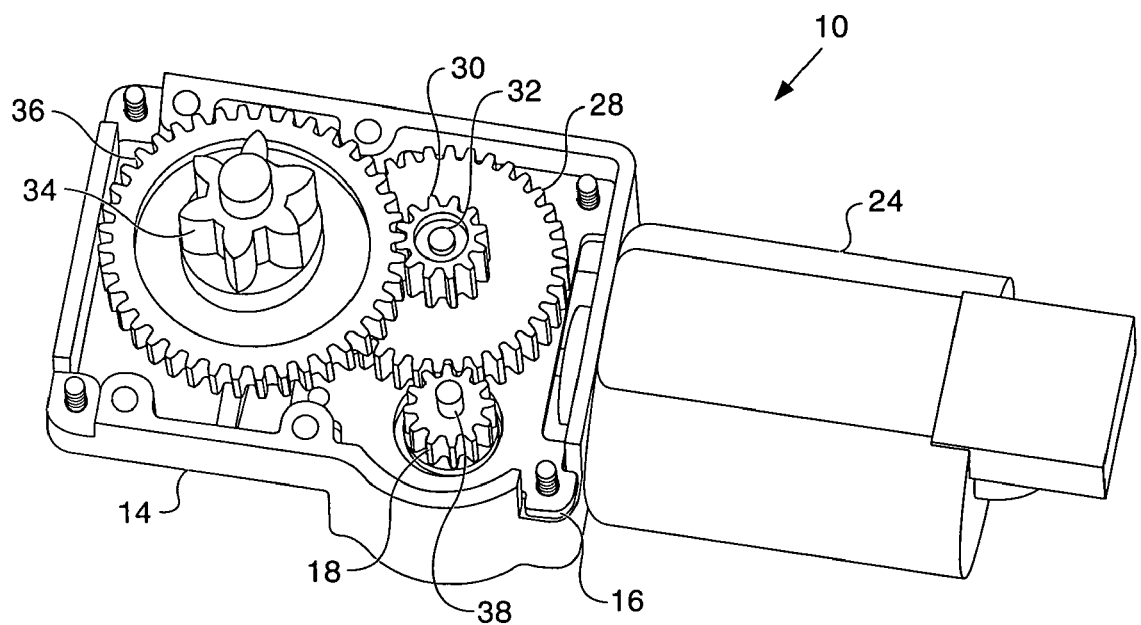
FIG. 3 is a perspective view of the assembled first embodiment.

FIG. 2 illustrates an exploded view of the actuator 10, and FIG. 3 illustrates an assembled view of the actuator 10. The motor 24 includes an output shaft 25. A worm 22 is mounted on the output shaft 25. In the depicted embodiment, the worm 22 is made of plastic, for example, polyoxymethylen (POM) material. The worm 22 drives a worm gear 20. The worm gearing is comprised of the worm 22 and the worm gear 20 and provides a first stage of gear reduction.

A first pinion 18 is connected to the worm gear 20. In the depicted embodiment, the first pinion 18 includes a hole 19 to receive a first shaft 38 such that the worm gear 20 and the first pinion 18 rotate about the first shaft 38. The first pinion 18 drives a first spur gear 28. The combination of the first pinion 18 and the first spur gear 28 provide a second stage of gear reduction.

A second pinion 30 is connected to the first spur gear 28. In the depicted embodiment, the second pinion 30 includes a hole 31 to receive a second shaft 32 such that the spur gear 28 and the second pinion 30 rotate about the second shaft 32. The second pinion 30 drives a second spur gear 36. The combination of the second pinion 30 and the second spur gear 36 provide a third stage of gear reduction.

The output member 34 is connected to the second spur gear 36. In the depicted embodiment, the output member 34 is a gear, such as a pinion gear.

In the embodiment depicted in FIG. 2, a plurality of fasteners 12 extend through a corresponding plurality of holes 13, which are located in the gearbox housing 14, and are received by threaded holes (not shown) in the gearbox cover 26. In this manner, the gearbox cover 26 may securely fastened to the gearbox housing 14.

The actuator 10 further includes a dividing plate 16. The dividing plate 16 divides the stages of gear reduction. For example, the dividing plate 16 may be used to divide the first stage of gear reduction and the second stage of gear reduction. In the depicted embodiment, the dividing plate 16 is adapted for mounting on the gearbox housing 14. However, those skilled in the art would understand that the dividing plate 16 may be mounted in other ways so long as it is removable to allow access to each stage of gear reduction.

Figure 4A:
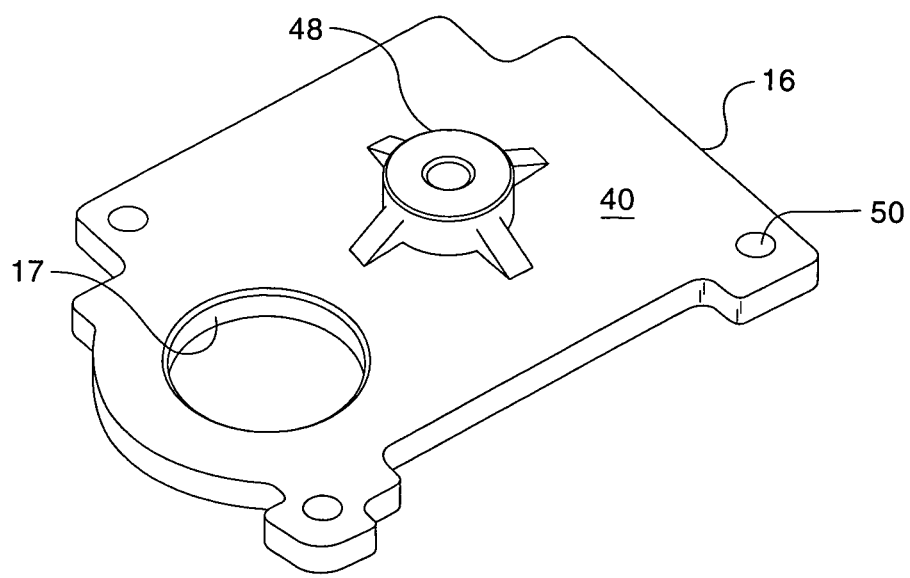
FIG. 4a is a perspective view of a dividing plate illustrating a first side.
Figure 4B:
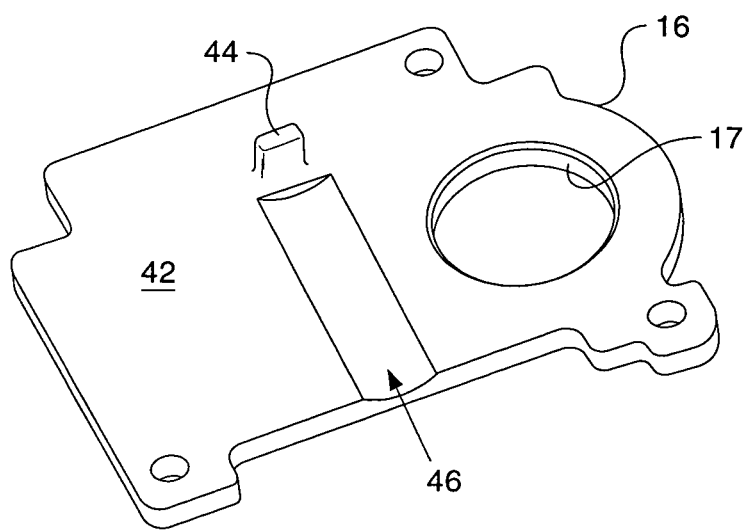
FIG. 4b is a perspective view of the dividing plate illustrating a second side.

As best seen in FIGS. 4a and 4b, the dividing plate 16 has a first face 40 and a second face 42. The second face 42 is opposite of the first face 40. The second face 42 includes a protrusion 44 and a recess 46. The protrusion 44 cooperates with the output shaft 25 and/or the worm 22 to reduce movement of the worm 22.

In some embodiments, the dividing plate 16 further includes an opening 17, a mount 48, and a plurality of mounting holes 50. For example, the first stage of gear reduction may be connected to the second stage of gear reduction at the opening 17. The mount 48 is used to support an element, for example, in the embodiment depicted in FIG. 2, the first spur gear 28 and the second pinion 30 are rotatably mounted on and supported by the mount 48. The plurality of mounting holes 50 may be used to attach the dividing plate 16 to the gearbox housing 14 or the gearbox cover 26.

Figure 5:
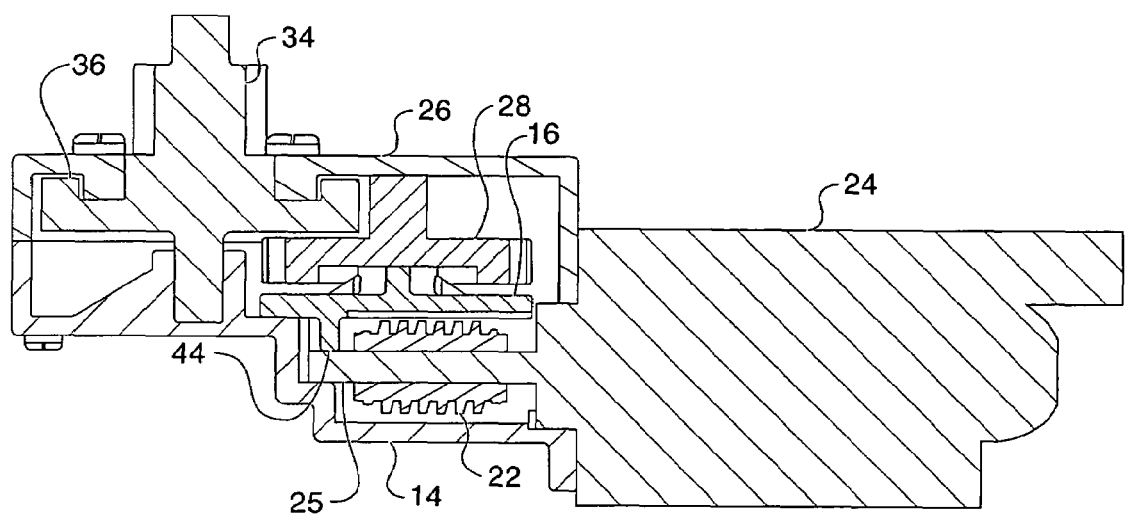
FIG. 5 is a sectional side view of the partially assembled first embodiment.

As best seen in FIG. 5, the dividing plate 16 is mounted over the worm 22. In the depicted embodiment, the protrusion 44 contacts the radial circumference of the shaft 25, thereby reducing transverse or radial movement. It is within the scope of the invention that the protrusion 44 may also contact the axial end of the worm 22, thereby reducing axial movement of the worm/shaft assembly.

The recess 46 is dimensioned to receive at least a portion of the worm 22. The recess 46 aids in the reduction of radial variance of the worm 22. The recess 46 also helps the worm 22 to avoid occupying space unnecessarily and thus to make the design more compact.

Figure 9:
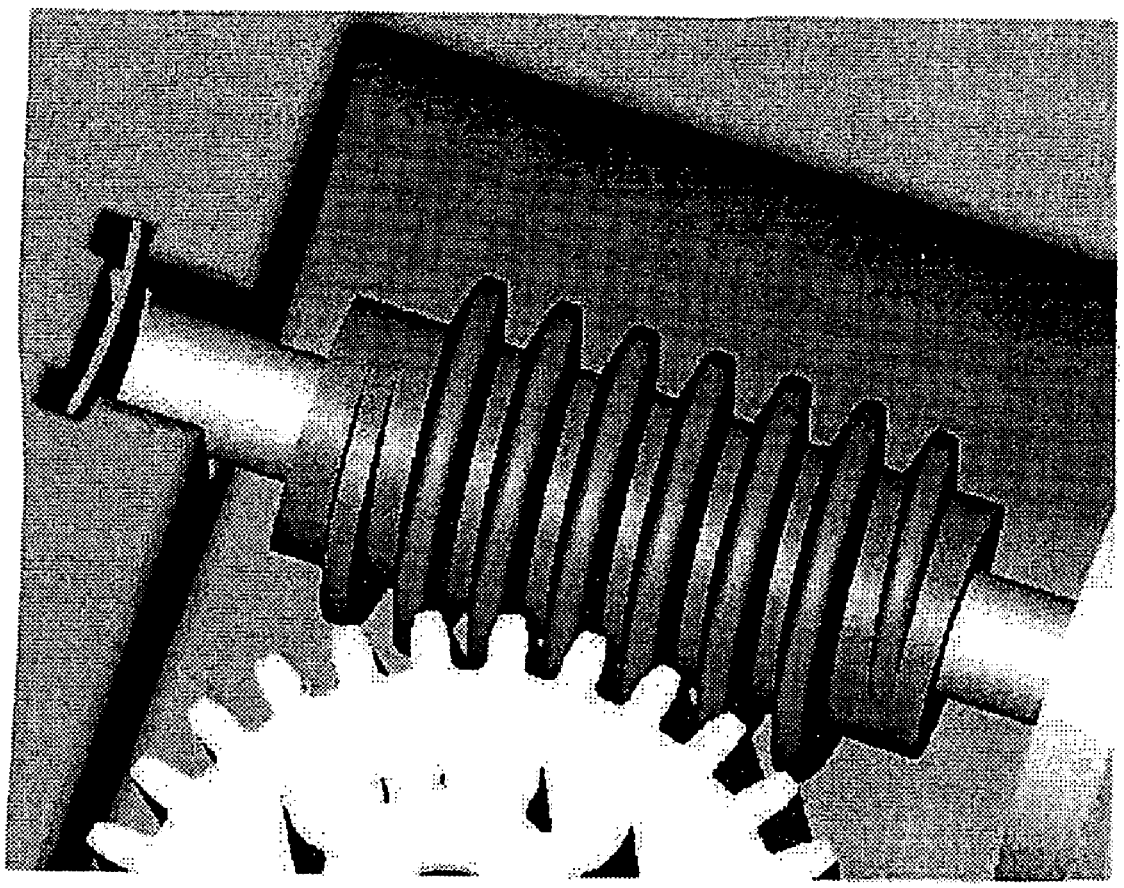
FIG. 9 is a perspective view of the seated motor shaft/worm assembly.

FIG. 9 is a perspective view of the shaft/worm assembly seated in one version of the house 14. Spring 50 is also seated in the recess provided for it. Spring 50 contacts the axial end of shaft 25 and biases it towards the motor, thereby stabilizing it against variance or travel.

In operation, the motor 24 rotates the output shaft 25, which in turn rotates the worm 22. The worm 22 drives the worm gear 20. The first pinion 18 rotates with the worm gear 20 and drives the first spur gear 28. The second pinion gear 30 rotates with the first spur gear 28 and drives the second spur gear 36. The output member 34 rotates with second spur gear 36.

Figure 6:
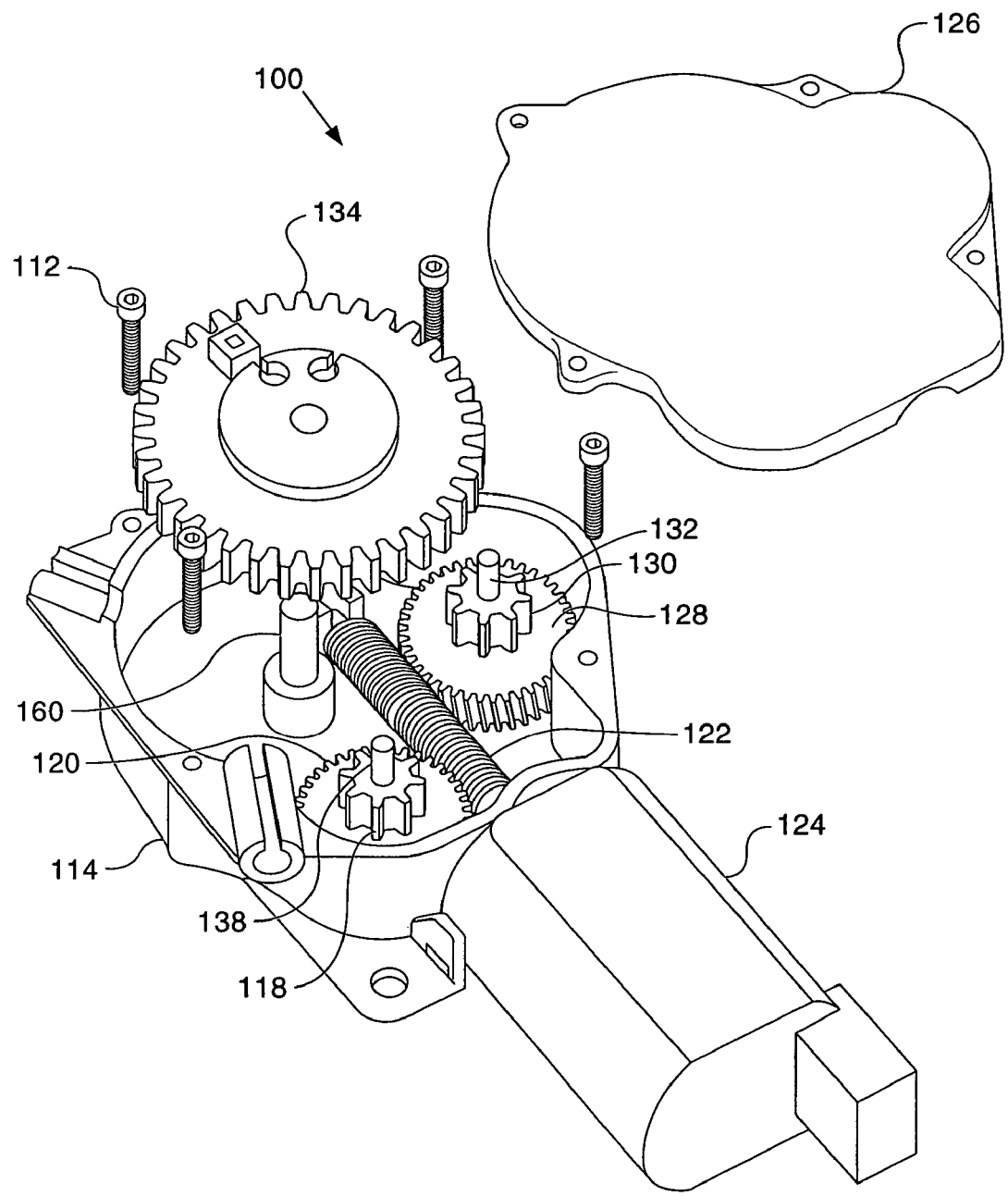
FIG. 6 is an exploded perspective view of the actuator in a second embodiment.
Figure 7:
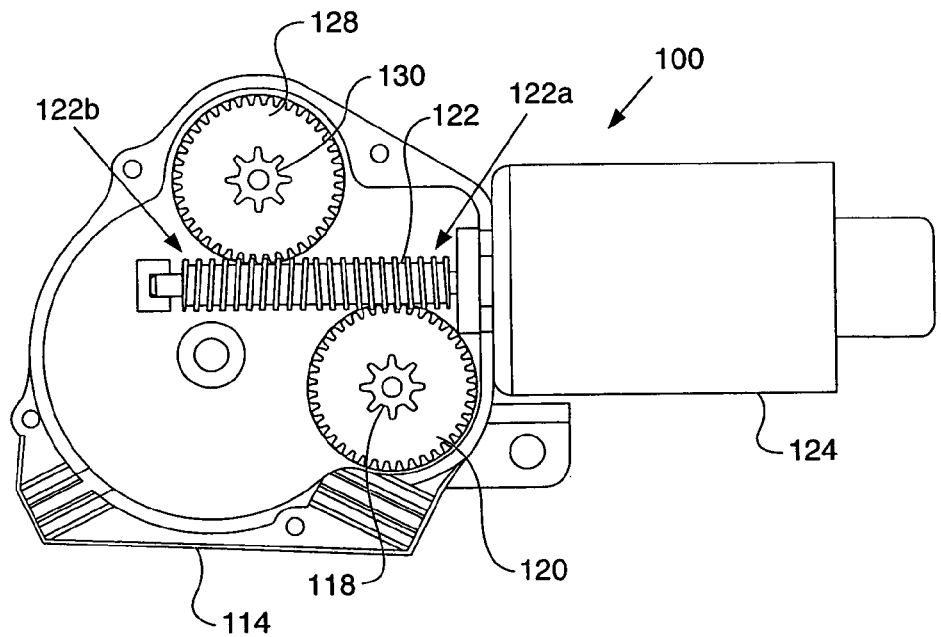
FIG. 7 is a top view of the second embodiment.
Figure 8:
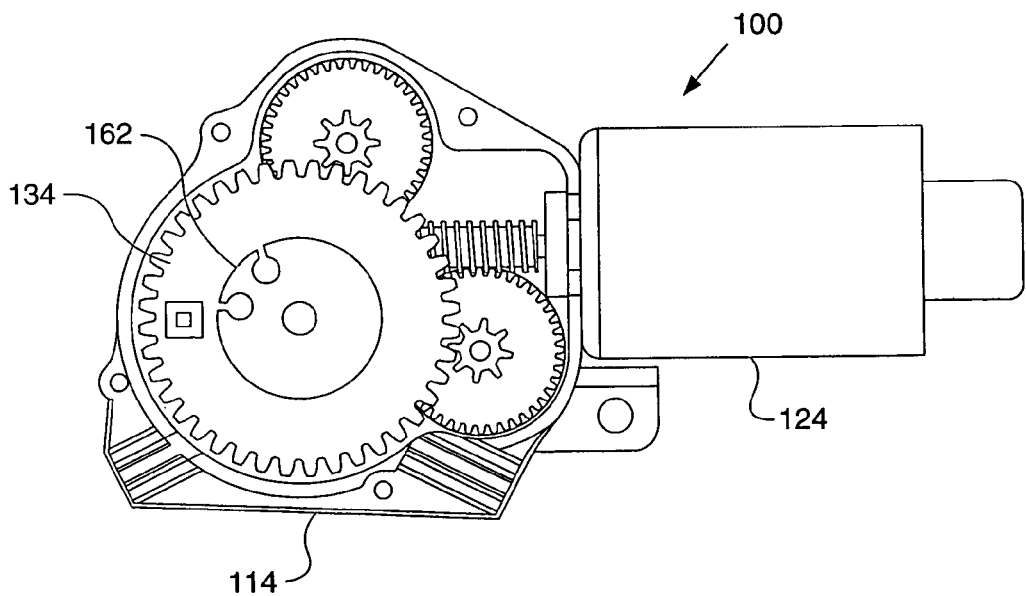
FIG. 8 is a top view of the assembled second embodiment.

FIGS. 6, 7 and 8 illustrate a second embodiment of the actuator, generally indicated by numeral reference 100. The actuator 100 includes a motor 124 and gearbox housing 119. A worm 122 is connected to a drive shaft of the motor 124. The worm 122 has two tooth portions, each having opposing helix directions. The teeth on a first half 122a are in right-hand helix direction and those on the second half 122b are in left-hand helix direction. While in the depicted embodiments a single worm component 122 has two tooth portions, those skilled in the art would understand that two worm components, each having its own helix direction, could equally be used and assembled in tandem on the shaft.

The worm 122 drives a right-hand worm gear 120 and a left-hand worm gear 128. In other words, the single-lead worm 122 drives a first worm gear 120 with a right-hand helix tooth direction and a second worm gear 128 with a left-hand helix tooth direction. Thus, the first stage of gear reduction has two sets of worm/worm wheel meshing. The axial forces generated by each worm meshing are in opposite directions. The forces are of the same value, due to the opposite helix angle. In the depicted embodiment, the gear radio and pitch of both worm/worm gear assemblies are substantially equivalent. Therefore, the axial force on the motor shaft is counter-balanced and will not affect the motor 124.

Undesirable axial travel of the motor shaft is reduced. The application of dual worm transmission is equivalent to a double-lead worm transmission having the same reduction ratio conditions, and the use of two sets of worm/worm wheel meshing increases transmission efficiency. In the depicted embodiment, the first worm gear 120 rotates about a first shaft 138, and the second worm gear 128 rotates about a second shaft 132.

When the motor 124 operates, it drives the first worm gear 120 and the second worm gear 128 and realizes two sets of worm/worm gear meshing, each worm meshing on the worm shaft are in opposite direction due to an opposite helix angle of the worm 122 used on the same part. Thus, no axial force is forwarded to push the motor end cap.

The counter-balance of the axial forces of the actuator motor eliminates clicking noises commonly found in worm-drive actuators and reduces noise and vibration of the actuator. The dual mesh approach also increases power transmission efficiency of the actuator. This results in higher output torque with lower input. Finally, the dual mesh approach increases gear strength and reduces the size of the actuator.

A first pinion 118 is connected to the right-hand worm gear 120, and a second pinion 130 is connected to the left-hand worm gear 128. The first pinion 118 and the second pinion 130 rotate in the same direction. The first pinion 118 and the second pinion 130 drive a spur gear 134. In the depicted embodiment, the spur gear rotates about a third shaft 160. The spur gear 134 drives an output member 162. In the depicted embodiment, the output member 162 is a pulley. Application of two pinion gears driving the same output gear improves gear train strength and makes the design more compact.

Optionally, the actuator 100 includes a gearbox cover 126. The gearbox cover may be mounted on the gearbox housing 114 through the use of a plurality of fasteners 112.

In operation, the motor 124 rotates the worm 122. The worm 122 drives the first worm gear 120 and the second worm gear 128. The first pinion 118 and the second pinion 130 rotate with the first worm gear 120 and the second worm gear 128. The first pinion 118 and the second pinion 130 cooperate to drive the spur gear 134. The output member 162 rotates with the spur gear 134.

A method of assembling an actuator, the method comprising the steps of: providing a gearbox housing; connecting a motor having an output shaft to said gearbox housing; rotatably connecting at least one worm gear to said gearbox housing; connecting a worm to said output shaft and in driving communication with said at least one worm gear; removably connecting a dividing plate to said housing and having at least one opening, said dividing plate having a recess to receive said worm such that said worm at least partially rotates within said recess; locating at least one pinion gear within said at least one opening; operatively connecting said at least one pinion gear to said at least one worm gear; placing at least one spur gear in a driven relationship with said at least one pinion gear; and connecting an output member to said at least one spur gear for rotation therewith. Optionally, the method may include the step of: connecting a gearbox cover to said gearbox housing.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An actuator comprising:
   a. a motor assembly having an output shaft;
   b. a gearbox assembly having a first stage of gear reduction and a second stage of gear reduction, wherein said first stage of gear reduction includes at least one worm and said first stage of gear reduction is operatively connected to said output shaft of said motor assembly; and
   c. a dividing plate intermediate said first stage and said second stage of gear reduction and said dividing plate biasing said at least one worm to reduce axial movement of said at least one worm.

2. The actuator according to claim 1, wherein said dividing plate includes an opening and first stage of gear reduction is in communication with said second stage of gear reduction at said opening.

3. The actuator according to claim 1, wherein said dividing plate includes a protrusion that reduces an axial movement of said at least one worm.

4. The actuator according to claim 1, wherein said gearbox assembly includes a gearbox housing and a gearbox cover adapted for mounting on said gearbox housing.

5. The actuator according to claim 1, wherein said second stage includes at least one spur gear and at least one pinion.

6. The actuator according to claim 1, further comprising at least one other stage of gear reduction.

7. The actuator according to claim 1, wherein said first stage further comprises at least one worm gear.

8. The actuator according to claim 1, further comprising an output member.

9. The actuator according to claim 1, wherein said output member is a gear.

10. The actuator according to claim 1, wherein said output member is a pulley.

11. The actuator according to claim 1, wherein said first stage includes a first worm gear having a right-hand helix angle and a second worm gear having a left-hand helix angle.

12. The actuator according to claim 1, wherein said at least one worm has a first portion with a first tooth direction and a second portion having a second tooth direction.

13. An actuator comprising:
   a. a gearbox housing;
   b. a motor having an output shaft and connected to said gearbox housing;

c. at least one worm gear rotatably connected to said gearbox housing;
d. at least one worm connected to said output shaft and in driving communication with said at least one worm gear;
e. a dividing plate removably connected to said housing and having at least one opening, said dividing plate having a recess to receive said at least one worm such that said at least one worm rotates within said recess;
f. at least one pinion gear located within said at least one opening and operatively connected to said at least one worm gear;
g. at least one spur gear driven by said at least one pinion gear; and
h. an output member connected to said at least one spur gear for rotation therewith.

14. The actuator according to claim 13, wherein said dividing plate includes a protrusion that limits an axial movement of said at least one worm.

15. The actuator according to claim 13, wherein said worm is made of polyoxymethylen.

16. The actuator according to claim 13, wherein said output member is a gear.

17. The actuator according to claim 13, wherein said output member is a pulley.

18. The actuator according to claim 13, further comprising a gearbox cover adapted for mounting on said gearbox housing.

19. The actuator according to claim 13, further comprising at least one other pinion and at least one other spur gear.

20. The actuator according to claim 13, wherein said at least one worm gear comprises a right-hand helix angle and a second worm gear having a left-hand helix angle.

21. The actuator according to claim 13, wherein said at least one worm has a first portion with a first tooth direction and a second portion having a second tooth direction.

22. A method of assembling an actuator, the method comprising the steps of:
a. providing a gearbox housing;
b. connecting a motor having an output shaft to said gearbox housing;
c. rotatably connecting at least one worm gear to said gearbox housing;
d. connecting a worm to said output shaft and in driving communication with said at least one worm gear;
e. removably connecting a dividing plate to said housing and having at least one opening, said dividing plate having a recess to receive said worm such that said worm rotates within said recess;
f. locating at least one pinion gear within said at least one opening;
g. operatively connecting said at least one pinion gear to said at least one worm gear;
h. placing at least one spur gear in a driven relationship with said at least one pinion gear; and
i. connecting an output member to said at least one spur gear for rotation therewith.

23. The method according to claim 22, further comprising the step of: connecting a gearbox cover to said gearbox housing.

24. The method according to claim 22, wherein said at least one worm gear comprises a right-hand helix angle and a second worm gear having a left-hand helix angle.

* * * * *